(12) United States Patent
Baird et al.

(10) Patent No.: US 7,158,905 B2
(45) Date of Patent: Jan. 2, 2007

(54) FIELD REPLACEABLE SENSOR MODULE AND METHODS OF USE THEREOF

(75) Inventors: Alistair R. W. Baird, Saunderstown, RI (US); Thomas F. Spock, East Greenwich, RI (US)

(73) Assignee: Tyco Flow Control, Inc., Princeton, NJ (US)

( * ) Notice: Subject to any disclaimer, the term of this patent is extended or adjusted under 35 U.S.C. 154(b) by 0 days.

(21) Appl. No.: 11/100,043

(22) Filed: Apr. 6, 2005

(65) Prior Publication Data

US 2005/0222794 A1 Oct. 6, 2005

Related U.S. Application Data

(60) Provisional application No. 60/559,945, filed on Apr. 6, 2004.

(51) Int. Cl.
*G01C 19/00* (2006.01)
*G01C 25/00* (2006.01)
*G01D 18/00* (2006.01)

(52) U.S. Cl. ........................ 702/104; 702/47; 702/116; 73/1.59

(58) Field of Classification Search ................ 702/104
See application file for complete search history.

(56) References Cited

U.S. PATENT DOCUMENTS

| 6,237,394 | B1 | 5/2001 | Harris et al. ................. 73/1.88 |
| 6,450,005 | B1 | 9/2002 | Bentley ....................... 73/1.59 |
| 6,581,436 | B1 | 6/2003 | Mannhart ................... 73/1.68 |
| 6,701,274 | B1 * | 3/2004 | Eryurek et al. ............. 702/140 |

FOREIGN PATENT DOCUMENTS

WO   WO 02/01057   1/2002

OTHER PUBLICATIONS

U.S. Appl. No. 60/559,945, entitled Field Replaceable Sensor Module and Methods of Use Thereof, filed on Apr. 6, 2004.

* cited by examiner

*Primary Examiner*—John Barlow
*Assistant Examiner*—Sujoy Kundu
(74) *Attorney, Agent, or Firm*—Daniel N. Daisak

(57) ABSTRACT

A field replaceable sensor module having a housing, that is capable of being ready connected and disconnected to a multipurpose device The housing includes one or more input ports and one or more electtical interface connectors. One or more sensors are operatively connected to the one or more input ports and attached to a surface of the housing. An electrical subsystem capable of receiving one or more signals from the one or more sensors provides one or more digitized output signals. A computer readable memory is also included to store sensor calibration data.

11 Claims, 9 Drawing Sheets

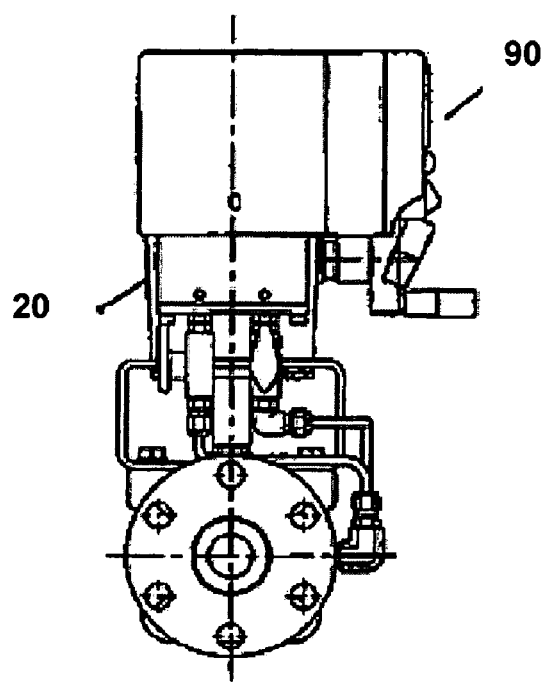
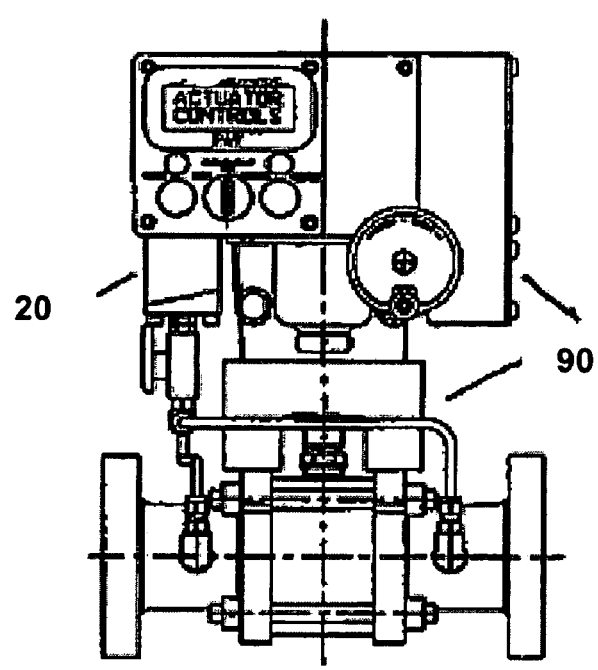
FIG. 5a
FIG. 5b

FIELD REPLACEABLE SENSOR MODULE AND METHODS OF USE THEREOF

CROSS REFERENCE TO RELATED APPLICATIONS

This application and claims priority of U.S. Provisional Patent application Ser. No. 60/559,945, entitled FIELD REPLACEABLE SENSOR MODULE AND METHODS OF USE THEREOF, filed on Apr. 6, 2004, which is incorporated by reference herein.

BACKGROUND OF THE INVENTION

This invention relates generally to sensors and sensor modules.

In a variety of applications, pressure sensor or modules are utilized as part of or in conjunction with multipurpose devices. In those applications, replacement of a pressure sensor module typically requires re-calibration of the pressure sensor in conjunction with the multipurpose device. That is, the pressure sensors have to be calibrated along with the actual portion of the device that utilizes the pressure sensor output, rendering the pressure sensors and the device a matched set. Thus, servicing a sensor or the actual portion of the device that utilizes the sensor requires replacement or re-calibration in the field.

In the applications where pressure sensor or modules are utilized as part of or in conjunction with multipurpose devices, the sensors are connected to the multipurpose device by means of external cables and conduits. Such a connection presents reliability challenges.

There is a need for sensor modules that are field replaceable.

There is also a need for sensors that couple to the device in a more robust manner.

SUMMARY OF THE INVENTION

Satisfying the needs described above as well as further and other objects and advantages of the present invention are achieved by the embodiments of the invention described hereinbelow.

A field replaceable sensor module of this invention comprises a housing, the housing being configured such that the housing is capable of being ready connected and disconnected to a multipurpose device and including one or more pressure input ports, and one or more electrical interface connectors, one or more pressure sensors operatively connected to the one or more input ports and attached to a surface of the housing, an electrical subsystem capable of receiving one or more signals from the one or more pressure sensors and capable of providing one or more digitized output signals, and a computer readable memory having data stored therein, the data comprising sensor calibration data. The electrical subsystem and the computer readable memory are electrically connected to the one or more electrical interface connectors such that the one or more digitized output signals are available from the one or more electrical interface connectors and the computer readable memory is accessible from the one or more interface connectors. The electrical subsystem and the computer readable memory are disposed on a surface of the housing. The module can also include a temperature sensor. In the embodiment that includes the temperature sensor, the computer readable memory has data stored therein that describes the temperature effects on calibration.

Methods for providing a field replaceable sensor module are also described.

For a better understanding of the present invention, together with other and further objects thereof, reference is made to the accompanying drawings and detailed description and its scope will be pointed out in the appended claims.

BRIEF DESCRIPTION OF THE DRAWINGS

FIGS. 5a and 5b are views of a schematic pictorial representation of an embodiment of the field replaceable sensor module of this invention attached to a multipurpose device;

DETAILED DESCRIPTION OF THE PREFERRED EMBODIMENTS

Method and systems for providing a field replaceable sensor module are described hereinbelow.

Figure 1:
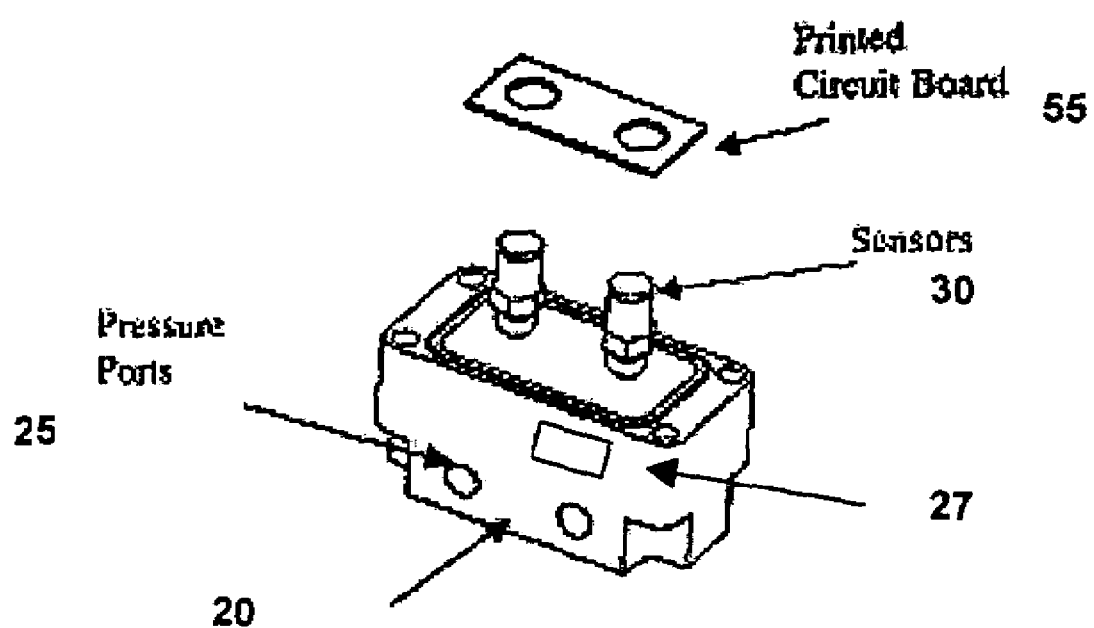
FIG. 1 is a schematic pictorial representation of an embodiment of a field replaceable sensor module of this invention.
Figure 2:
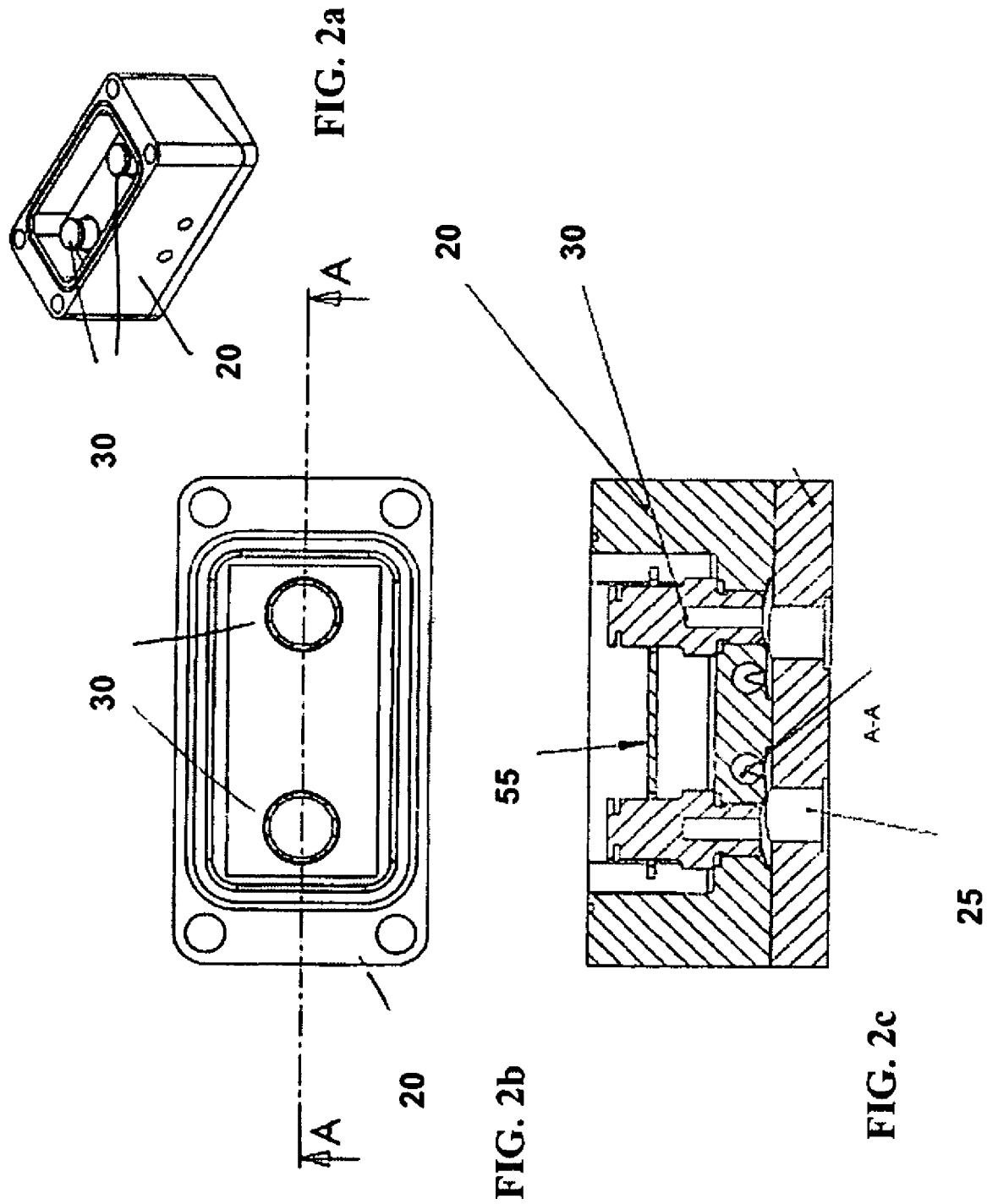
FIGS. 2a, 2b, and 2c are views of a schematic pictorial representation of another embodiment of the field replaceable sensor module of this invention.
Figure 3:
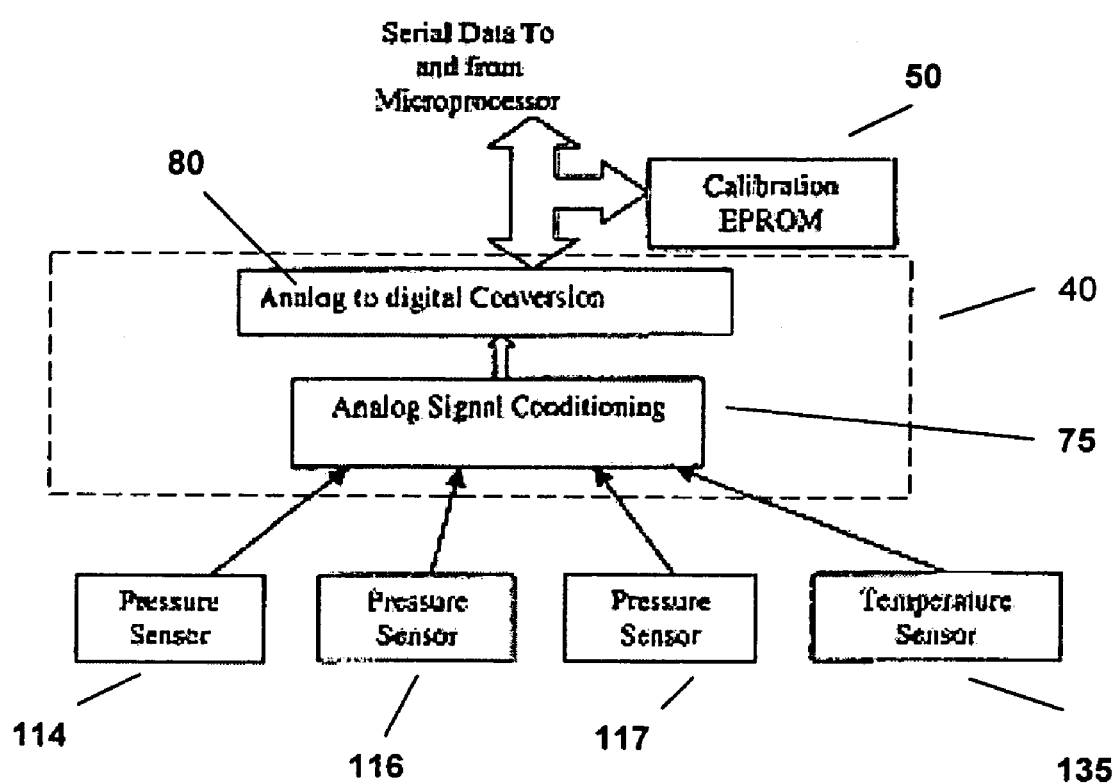
FIG. 3 is a block diagram representation of an embodiment of the field replaceable sensor module of this invention.

A schematic pictorial representation of an embodiment of the field replaceable sensor module 10 of this invention is shown in FIG. 1. A block diagram representation of an embodiment of the field replaceable sensor module of this invention is shown in FIG. 3. Referring to FIGS. 1 and 3, the field replaceable sensor module 10 of this invention includes a housing 20, one or more pressure sensors 30, an electrical subsystem 40 (FIG. 3), and a computer readable memory 50 (FIG. 3). In one embodiment, the field replaceable sensor module 10 also includes a temperature sensor 60 (FIG. 3). The temperature sensor 60 could be located in the interior of the housing 20 or in any location in the housing from which a temperature characteristic of the pressure sensors 30 can be determined. The housing 20 is capable of being readily connected and disconnected to a multipurpose device (90, FIG. 5) and has one or more pressure input ports 25. One or more electrical interface connectors 27 can be, but are not limited to, located in the housing, on a printed circuit board 55 located on a surface of the housing or any other conveniently accessible location. The one or more pressure sensors 30 are operatively connected to the one or more pressure input ports 25 and are attached to a surface 12 of the housing 20. An embodiment in which the one or more pressure sensors 30 are operatively connected to the one or more pressure input ports 25 is shown in FIGS. 2a, 2b, 2c. The electrical subsystem 40 is capable of receiving one or more signals from the one or more pressure sensors 30 and capable of providing one or more digitized output signals 65 (FIG. 3). The data stored in the computer readable memory 50 includes calibration data for the one or more pressure sensors 30. The electrical subsystem 40 and the computer readable memory 50 are electrically connected to the one or more electrical interface connectors 27 such that the one or more digitized signals 65 are available from the one or more electrical interface connectors 27 and the computer readable memory 50 is accessible from the one or more electrical interface connectors 27. The electrical subsystem 40 and the computer readable memory 50 are disposed on a surface 12 of the housing 10. In one embodiment, the electrical subsystem 40 and the computer readable memory 50 are located on a printed circuit board 55 (FIG. 1) and the printed circuit board 55 is disposed on a surface 12 of the housing 10. In the embodiment in which the field replaceable sensor module 10 also includes a temperature sensor 60, the computer readable memory 50 has data stored therein that describes the temperature dependence of the calibration data. In one embodiment, the housing 20 is designed as a "plug-in" module. In one embodiment, shown in FIGS. 5a and 5b, the housing 20 is designed to be mounted external to a multipurpose device 90, such as, but not limited to, a device including an electric actuator, with bolts and the connection to the pressure input ports 25 sealed with an 'O' ring or similar seal.

Figure 4:
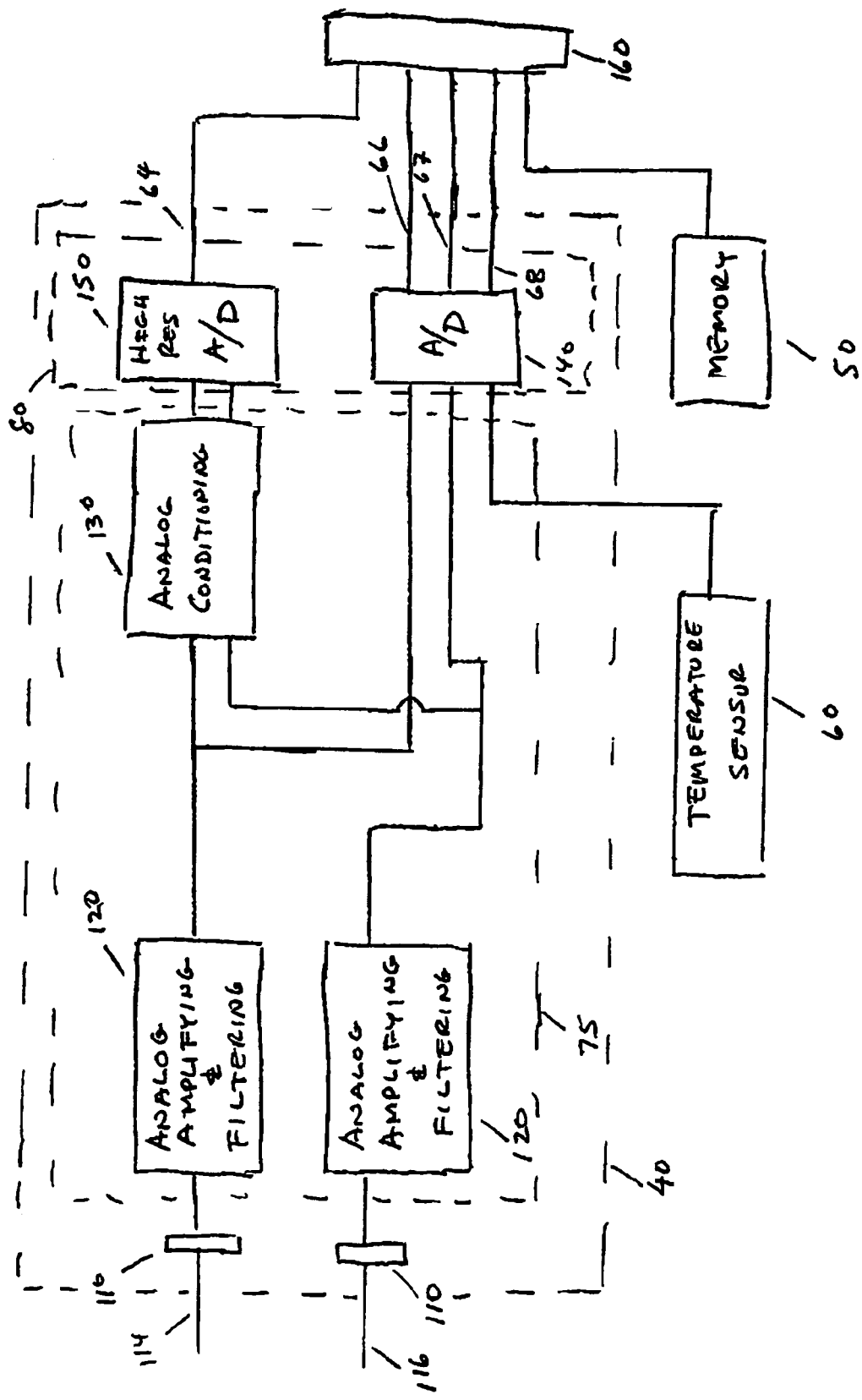
FIG. 4 is a block diagram representation of an embodiment of an electrical subsystem of the field replaceable sensor module of this invention.

A block diagram representation of an embodiment of the electrical subsystem 40 of the field replaceable sensor module 10 of this invention is shown in FIG. 4. Referring to FIGS. 3 and 4, electrical signal 114 and 116 from the pressure sensors 30 are provided to the electrical subsystem 40. Each electrical signal 114 or 116 from one of the pressure sensors 30 is amplified and filtered by and analog amplifying and filtering subsystem 120. For obtaining digitized output from each of the electrical signals 114 or 116, the output of each of the analog amplifying and filtering subsystems 120 is digitized by a multi Channel A/D 140. The analog output 135 of the temperature sensor 60 is also provided to the multi Channel A/D 140. The multi Channel A/D 140 provides the digitized output 66, 67 and 68 to the interface connector 160. If the difference between the pressures is also desired, the output of each of the analog amplifying and filtering subsystems 120 is provided to an analog conditioning subsystem 130. The outputs of the analog conditioning 130 are provided to a high resolution A/D 150, which produces a digitized pressure difference signal 64 and provides the pressure difference signal 64 to the to the interface connector 160.

A processor (420, FIG. 9) can receive the signals from the A to D converter(s) 140 and 150 and from the computer readable memory 50. The pressure data 64, 66, 67 can then be processed and manipulated depending on the host processor (microprocessor, for example) application requirements. In one embodiment, but not limited to, the processor is located in the multipurpose device 90 and receives signals from the A to D converter(s) 140 and 150 and from the computer readable memory 50 via the electrical interface connector 160.

The computer readable memory 50 can be one of a variety of non-volatile memories, such as, but not limited to, EPROMS, EEPROMs, flash memories, or disk drives. The temperature sensor can be, in one embodiment but not limited to, a thermistor. The interface connector 160 can be the same as or electrically connected to the electrical interface connector 27. The electrical interface can be, but is not limited to, a serial data interface.

Each module is calibrated by applying range of known pressures to the pressure sensor ports, and if required, the pressures can be applied at different temperatures. The raw A to D digital values are recorded and the data is then stored in the non volatile memory (also referred to as a computer usable or readable medium) inside the module. If range of known pressures covers the range of operational values, the calibration curve can be obtained by, but is not limited to, linear interpolation between individual points, by polynomial interpolation or a variety of other interpolation methods. In addition to calibration data, serial number data and module type data is also stored in non-volatile memory permitting the host device to identify which type of module is connected.

Under processor control, a nominal zero condition can be created in the input pressure. The output of the pressure sensor(s) 30 can be obtained for the nominal zero condition. If the computer readable medium 50 is a rewritable/erasable memory, such as, but not limited to, an EEPROM memory, a magnetic memory or an optical memory, the output of the pressure sensor(s) 30 at nominal zero input condition can be stored and utilized to correct for sensor drift or aging.

Figure 6:
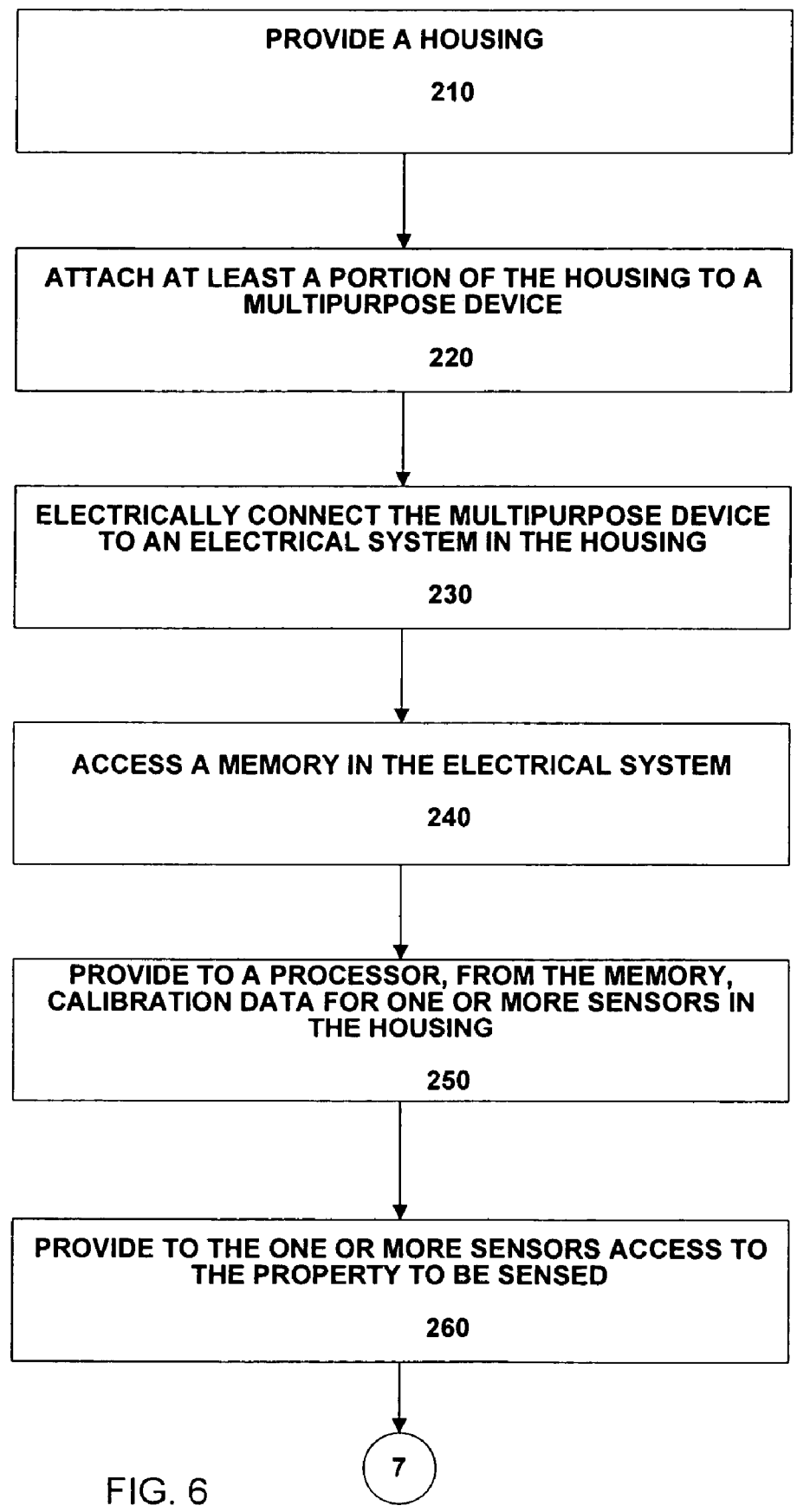
FIG. 6 is a flowchart representation of an embodiment of a method of this invention.

A flowchart representation of an embodiment of the method of this invention is shown in FIG. 6. Referring to FIG. 6, the method for providing a field replaceable sensor module includes providing a housing (step 210, FIG. 6), where one or more sensors are operatively attached to a surface of the housing and electrical system is disposed on the surface of the housing. At least a portion of the housing is attached to a multipurpose device (step 220, FIG. 6). The multipurpose device is electrically connected to the electrical system (step 230, FIG. 6). A computer readable medium (also referred to as a memory) in the electrical system is accessed (step 240, FIG. 6) in order to provide, from the memory, calibration data for the one or more sensors to a processing system (step 250, FIG. 6). Access to the property to be measured is provided to the one or more sensors (step 260, FIG. 6). The calibration data for the one or more sensors enables the determination at the multipurpose device of one or more quantities of a property to be measured from sensor output.

Figure 7:
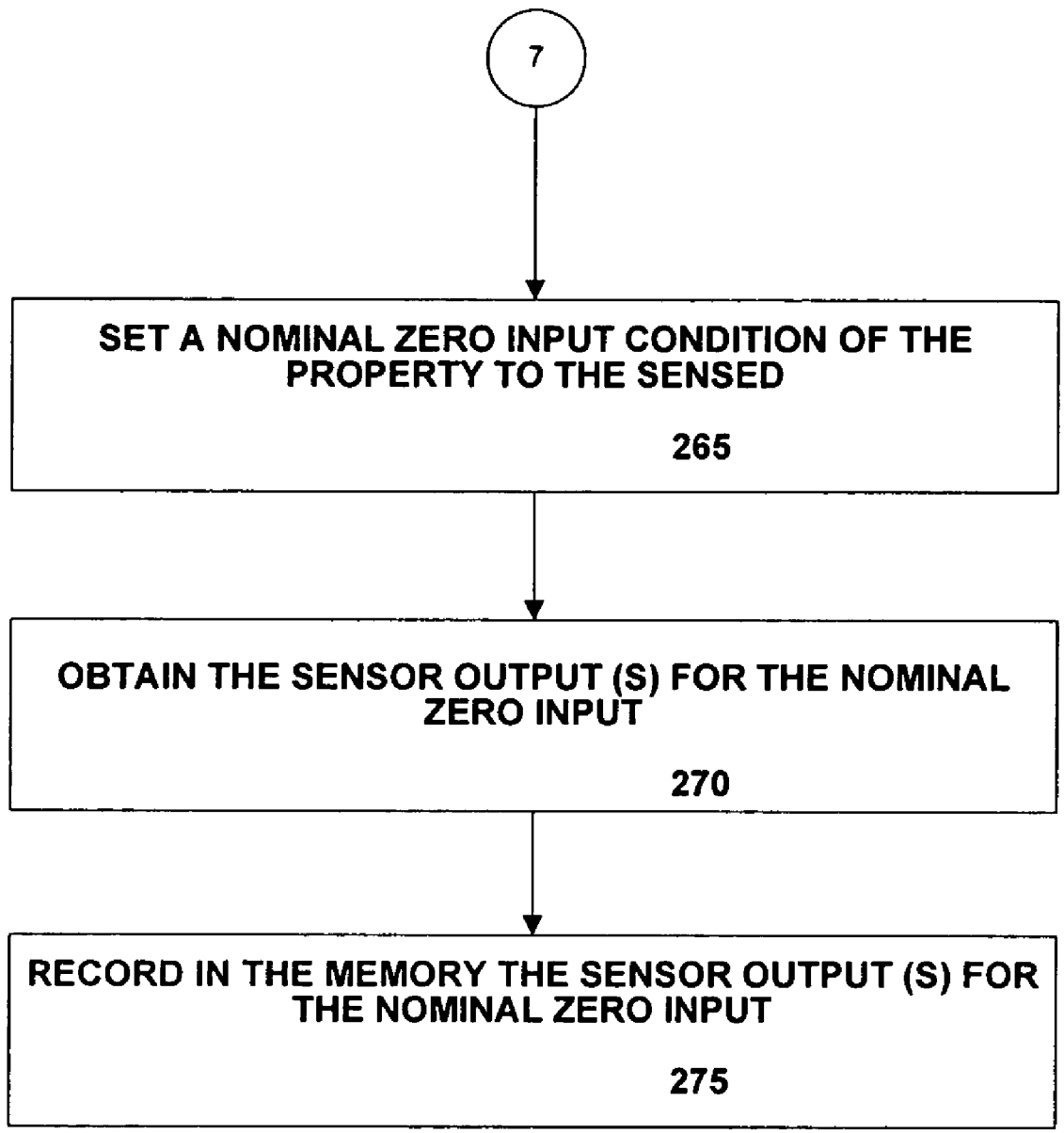
FIG. 7 is a flowchart representation of another embodiment of the method of this invention.

A method for obtaining and recording data to be used to correct for drift or aging of the sensors is shown in FIG. 7. Referring to FIG. 7, after step 260 of FIG. 6, the property to be measured is set to a nominal zero input condition (step 265, FIG. 7). Setting the property to be measured to a nominal zero input condition can occur under control of a processing system (such as, but not limited to, a microprocessor). In one embodiment, the sensors are pressure sensors. In that embodiment, the processor controls a valve that sets the input pressure to nominal zero. In one embodiment, the input pressure may be, but is not limited to, a differential pressure. An output is obtained from each of the one or more sensors for the nominal zero input (step 270, FIG. 7). The sensor outputs for the nominal zero input are recorded in the memory (step 275, FIG. 7). In one embodiment, but not limited to, the recording of the sensor outputs for the nominal zero input is performed under processor control. The recorded output provides means for a drift/aging correction for the one or more sensors.

Figure 8:
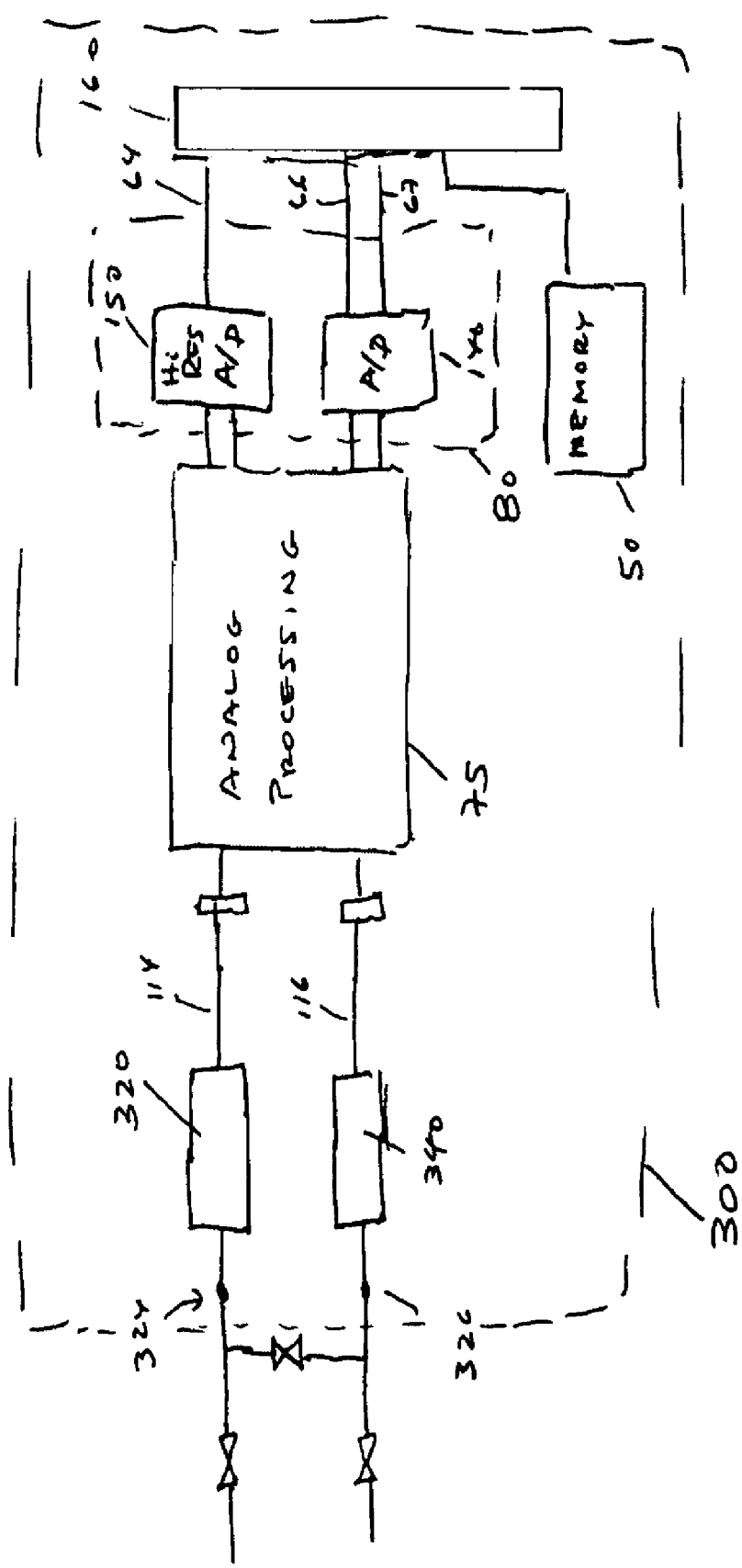
FIG. 8 depicts a block diagram representation of a configuration for performing a detailed embodiment of the method of FIG. 7.

A detailed embodiment, for a pair of pressure sensors, of the method of FIG. 7 is detailed below. FIG. 8 depicts a block diagram representation of a configuration for performing the detailed embodiment utilizing a pair of pressure sensors. Referring to FIG. 8, input valve 315 controls the pressure feed to pressure input port 324 in the field replaceable pressure sensor module 300. Input valve 310 controls the pressure feed to pressure input port 326 in the field replaceable pressure sensor module 300. Bypass valve 317 controls a connection between the pressure feed to pressure input port 324 and the pressure feed to pressure input port 326.

In order to obtain and record data to be used to correct for drift or aging of the two pressure sensors 320, 340 of FIG. 8, the following embodiment of the method, but not limited to, can be used. In step (a), a nominal zero differential pressure is applied to the pressure sensor pair by isolating the pressure feed to one port, for example pressure input port 324, and opening the bypass valve 317 between the ports, exposing both sensors to the same pressure, the pressure applied to pressure input port 326. Then, in step (b), the output signals 66 and 67 indicating the absolute/gauge pressure applied to the ports 324 and 326, which is the pressure applied to port pressure input port 326, are recorded in the memory 50. The output signal from the differential channel 64 is recorded in the memory 50 in step (c). Based on the recorded output signals, in step (d), an offset value correcting the effects of drift/aging can be obtained and applied to subsequent calibrations. It should be noted that equivalently, pressure input port 326 could be isolated and, upon opening the bypass valve 317, and both sensors could be exposed to the pressure applied to pressure input port 324. By repeating steps (b) through (d), other points in the drift/aging corrected calibration can be obtained.

Figure 9:
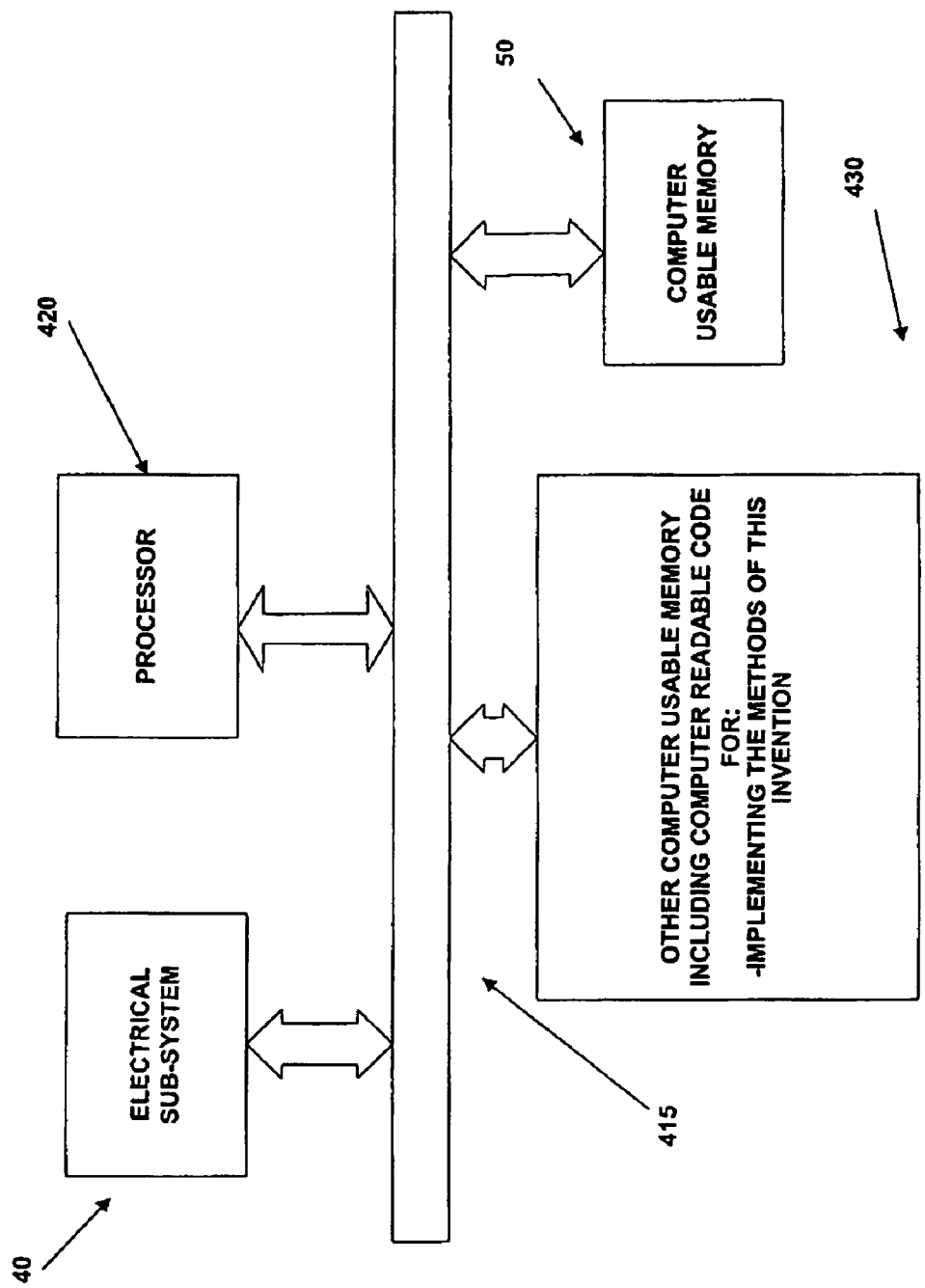
FIG. 9 depicts a block diagram representation of another embodiment of electrical system of this invention.

It should be noted that although the field replaceable sensor module 10 of this invention as described above does not include at least one processor, other embodiments are possible in which the field replaceable sensor module includes a processor. A schematic block diagram for an embodiment in which the system of this invention includes one or more processors (420, FIG. 9) is shown in FIG. 9. Shown in FIG. 9 are one or more processors 420 operatively connected by means of a connection component 415 (the connection component may be a computer bus, or a portion of the electrical interface connectors 27) to one or more other computer usable (readable) media 430 having computer usable code (also referred to as instructions or programs) embodied therein, where the computer usable code is capable of causing the one or more processors 420 to execute the methods of this invention. The electrical subsystem 40 is also operatively connected to the one or more processors 420 and the one or more other computer usable (readable) media 430.

It should be noted that embodiments in which the one or more processors 420 are located in the multipurpose device 90, located in both the multipurpose device 90 and in the module 10, or located in the module 10 are all within the scope of this invention. Also, embodiments in which the one or more other computer readable media 430 are located in any of the above locations are also within the scope of this invention. It should also be noted that the one or more other computer readable media 430 and the computer readable medium 40 can be the same computer readable medium in some embodiments.

Although the invention has been described with respect to various embodiments, it should be realized this invention is also capable of a wide variety of further and other embodiments within the spirit and scope of and scope of the appended claims.

What is claimed is:

1. A Field replaceable sensor module comprising:
   a housing, said housing being configured to be readily connected and disconnected to a multipurpose device, said housing comprising:
      at least one pressure input port, and
      at least one electrical interface connector;
   at least one sensor operatively connected to set out these one input port, said at least one sensor being mounted on a surface of said housing;
   an electrical subsystem capable of receiving at least one signal from said at least one sensor and also capable of providing at least one digitized sensor output signal;
   a computer readable medium having data stored therein, said data comprising sensor calibration data corresponding to a range of known pressures to the at least one pressure input port; and
   at least one processor configured to set a nominal zero input for a property to be measured and obtain an output from said at least one sensor for the nominal zero input;
   said electrical subsystem and said computer readable medium being electrically connected to said at least one electrical interface connector; said at least one digitized output signal being obtainable through the at least one interface connector and said computer readable medium being accessible through said at least one interface connector; and
   said electrical subsystem and said computer readable medium being mounted on said housing.

2. The field replaceable sensor module of claim 1 further comprising:
   a temperature sensor;
   wherein said calibration data further comprises data describing temperature effects on pressure to the at least one pressure input port.

3. The field replaceable sensor module of claim 1 wherein said electrical subsystem and said computer readable medium are mounted on a board; and where in said board is disposed on a surface of said housing.

4. The field replaceable sensor module of claim 1 wherein said electrical subsystem comprises:
   at least one amplifying and filtering subsystem; and
   a digitizing subsystem;
   said amplifying and filtering subsystem being capable of receiving said at least one signal from said at least one sensor and being electrically connected to said digitizing subsystem.

5. The field replaceable sensor module of claim 4 wherein said electrical subsystem further comprises:
   an analog conditioning subsystem; and
   a high resolution digitizing subsystem;
   said analog conditioning subsystem being capable of receiving signals from said at least one amplifying and filtering subsystem and being electrically connected to said high resolution digitizing subsystem.

6. The field replaceable sensor module of claim 1 wherein said at least one sensor comprises at least one pressure sensor.

7. The field replaceable sensor module of claim 1 wherein said data further comprises sensor identifying data.

8. The field replaceable sensor module of claim 1 further comprising:
   at least one other computer readable medium having computer readable code embodied therein, said computer readable code capable of causing said at least one processor to:
   access said at least one computer readable medium,
   obtain said sensor calibration data,
   receive said at least one digitized sensor output signal.

9. The field replaceable sensor module of claim 8 wherein said computer readable code is also capable of causing said at least one processor to:
   record in said at least one computer readable medium the output for the nominal zero input;
   wherein the recorded output provides means for a drift/aging correction for the at least one sensor.

10. A method for providing a field replaceable sensor module, the method comprising the steps of:
   providing a housing;
   attaching at least a portion of the housing to a multipurpose device;
   electrically connecting the multipurpose device to an electrical system, the electrical system being mounted on the housing;
   accessing a computer readable medium in the electrical system;
   providing, from the computer readable medium, calibration data for at least one sensor to a processing system, wherein the calibration data for the at least one sensor, the at least one sensor being operatively attached to a surface of the housing, provides a range of known physical characteristics to be measured at the sensor;
   setting a nominal zero input for the characteristic to be measured;
   obtaining an output from the at least one sensor for the nominal zero input; and
   recording the output for the nominal zero input in the computer readable medium wherein the recorded output provides means for a drift/aging correction for the at least one sensor.

11. The method of claim 10 further comprising the step of providing, to the at least one sensor, access to a characteristic to be measured.

* * * * *